United States Patent [19]

Weber

[11] Patent Number: 4,569,126
[45] Date of Patent: Feb. 11, 1986

[54] APPARATUS FOR PRESS FITTING MACHINE PARTS

[75] Inventor: Gottfried Weber, Cologne, Fed. Rep. of Germany

[73] Assignee: Ford Motor Company, Dearborn, Mich.

[21] Appl. No.: 608,839

[22] Filed: May 10, 1984

[30] Foreign Application Priority Data

Jul. 20, 1983 [DE] Fed. Rep. of Germany ....... 3326031

[51] Int. Cl.$^4$ .................... B23P 21/00; B23P 19/02; B23Q 17/00
[52] U.S. Cl. ...................................... 29/707; 29/525; 29/407
[58] Field of Search .................. 29/157.1 R, 229, 525, 29/235, 238, 252, 707, 709, 714, 718, 407

[56] References Cited

U.S. PATENT DOCUMENTS

| | | | |
|---|---|---|---|
| 3,481,019 | 12/1969 | Whitney | 29/707 |
| 3,619,888 | 11/1971 | Sawada et al. | 29/718 |
| 3,885,295 | 5/1975 | Engelberger et al. | 29/707 |

Primary Examiner—Howard N. Goldberg
Assistant Examiner—Steven Nichols
Attorney, Agent, or Firm—Frank G. McKenzie; Donald J. Harrington

[57] ABSTRACT

A residual distance to a stop surface and a minimum pressing force are specified. A machine part is moved through the residual distance. The pressing force is detected and compared with the specified minimum pressing force. The machine part is moved against the stop surface only when the pressing force exceeds the specified minimum pressing force.

9 Claims, 2 Drawing Figures

APPARATUS FOR PRESS FITTING MACHINE PARTS

BACKGROUND OF THE INVENTION

This invention relates to the press fitting of machine parts into bores or onto shafts.

When press fitting a part into a bore or onto a shaft having a surface that stops movement of the fitted part relative to the receiving part, it is impossible to check the quality of the press fit by simply measuring the force applied by a ram after the part has come to rest against the stop surface because the measured reaction force would rise excessively immediately on reaching the stop surface.

In the case of machine parts which are subject to high stresses and vibrations during their operation, it is important that the quality of the press fit should conform to a prescribed standard so that the machine part will not accidentally become detached during operation. The pressing of valve seat rings made of steel into bores that are sized to receive the rings in a cylinder head made of aluminum in an internal combusion engine is an example where the ability to check the quality of the press fit is vital.

SUMMARY OF THE INVENTION

This invention seeks to provide a method and apparatus for checking the pressing operation of machine parts into bores or onto shafts, which permits a reliable evaluation of the quality of the press fit.

According to a first aspect of the invention, there is provided a method of checking the process of press fitting a machine part into a bore or onto a shaft wherein a stop surface is provided to limit the movement of the fitted part relative to the receiving part. The method comprises the steps of specifying a residual distance between the stop surface and the fitted part, specifying a minimum pressing force, pressing the machine part up to the residual distance, detecting the magnitude of the pressing force exerted, comparing the pressing force exerted to the specified minimum pressing force, and pressing the machine part against the stop surface only if the pressing force exerted in pressing the part up to the residual distance from the stop surface exceeds the specified minimum pressing force.

According to a second aspect of the invention, there is provided an apparatus for press fitting a machine part into a bore or onto a shaft wherein a stop surface is provided to limit movement of the machine part to be fitted. The apparatus comprises a press ram, means for limiting movement of the ram when the machine part is at a predetermined residual distance from the stop surface, force measuring means for measuring the force exerted between the head of the ram and the machine part during the pressing operation up to the residual distance, and means for enabling further movement of the ram head only if the force measured by the measuring means exceeds a specified minimum value.

BRIEF DESCRIPTION OF THE DRAWINGS

The invention will now be described further, by way of example, with reference to the accompanying drawings.

DESCRIPTION OF THE PREFERRED EMBODIMENT

Figure 1:
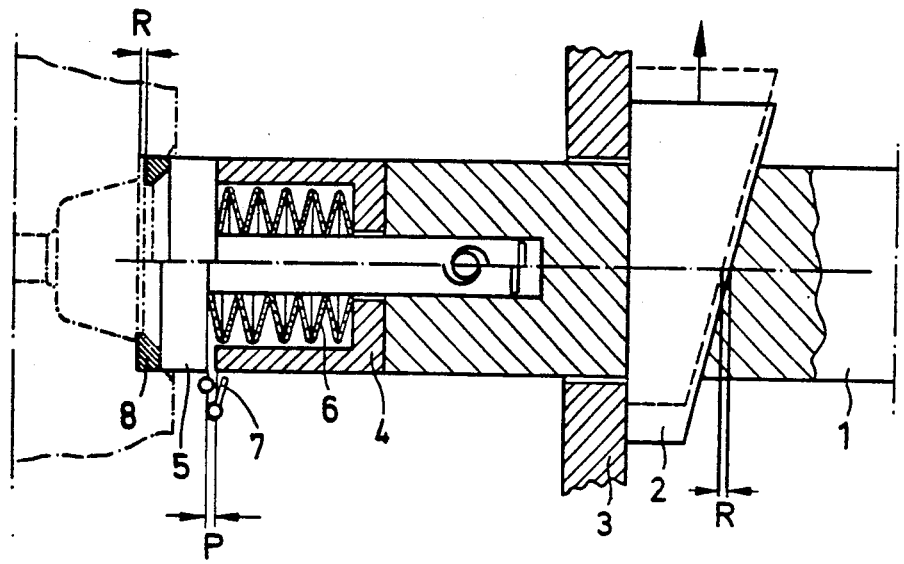
FIG. 1 is a diagrammatic cross section of a first device for press fitting a part in a member that receives the part according to the invention.

FIG. 1 shows a press ram 1 provided with a stop wedge 2, which is disposed transversely relative to the ram and cooperates with an abutment 3 arranged on the press fitting machine in order to halt the ram when the part 8 being press fitted is at a specified residual distance R from a stop surface formed on the member that receives the part. Between the head 5 of the end 4 and the ram 1, there is disposed a force-measuring apparatus that includes a spring mechanism 6 in the form of a set of Belleville springs preloaded to a minimum pressing force. The ram head 5 is held by the spring mechanism 6 at the distance P from the ram end 4 by the spring mechanism 6. The springs are deformed to close the gap P only if the minimum pressing force is exceeded. When the gap P closes, a microswitch 7 acting as a sensor produces a signal to indicate that the fit conforms to standard.

When this signal is generated, the stop wedge 2 is withdrawn from the path of the ram 1 in any convenient manner and the press ram 1 pushes the machine part 8, which in the illustrated example is a valve seat ring, through distance R against the stop surface.

As an example of the practice of this invention and use of the apparatus, in the process of pressing a valve seat ring made of steel into a corresponding bore in a cylinder head made of aluminum a residual distance R of 0.3 mm is selected, the minimum pressing force is set at 10000N and the gap P is set at 0.15 mm.

Figure 2:
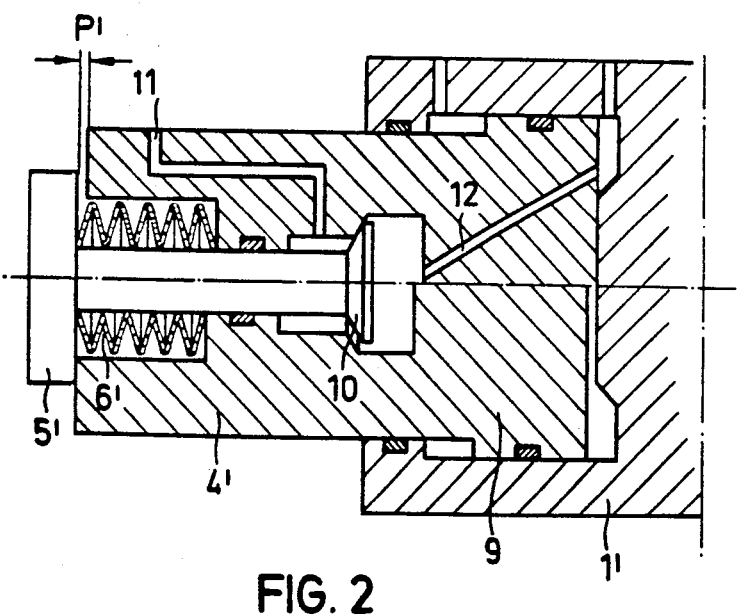
FIG. 2 is a cross section of a second apparatus for performing the method according to the invention.

In the apparatus illustrated in FIG. 2, parts corresponding to those of FIG. 1 have the same reference numerals but are primed.

The press ram of FIG. 2 is a two-stage ram. The end 4' of the ram is part of a piston 9 movable relative to the main ram 1' and is an auxiliary or second stage ram. As in the case of the embodiment described with reference to FIG. 1, the head 5' is mounted on the end 4' by way of a spring mechanism 6' which constitutes the force measuring means. There is a gap P', which closes while the specified minimum force is exceeded, between the end 4' of the ram and the ram head 5'. In this case, however, the ram head 5' is connected to a valve closure element 10 which controls the supply of a pressurized fluid from a supply duct 11 to a duct 12 that leads to the larger face of the piston 9. The valve is opened only when the ram head 5' has deformed the spring mechanism 6' sufficiently to close the gap P'.

In this way, as soon as the valve closure element 10 is lifted off its seat, pressurized fluid is supplied from the duct 11 by way of a channel 12 to the rear of the piston 9. This causes piston 9 to move the machine part through distance R and against the stop surface.

If, during the pressing operation, the spring mechanism 6' is not compressed sufficiently to close the gap P' due to an inadequate press fit between the fitted part and the receiving member, the valve closure element 10 will remain in the closed position and the second stage piston 9 will not be actuated. This provides a fault indication that can be used to remove from a mass production line the component in question having a defective press fit.

Having described my invention, what I claim and desire to secure by U.S. Letters Patent is:

1. A device for press fitting a fitted part to a receiving member having a stop surface that limits movement of the fitted part, comprising:
   a press ram, means for limiting movement of the ram when the fitted part is at a predetermined residual distance from the stop surface, force measuring means for measuring the force exerted between the head of the ram and the fitted part while pressing the fitted part up to said residual distance, and means for enabling further movement of the ram head only if the force measured by the measuring means exceeds a specified minimum value.

2. The device of claim 1, wherein the means for limiting the movement of the ram comprises a wedge located between the ram and an abutment, and the means for permitting further movement of the ram head comprises means for withdrawing the wedge from the path of the ram.

3. The device of claim 1, wherein the ram is formed as a two-stage ram, having the first stage operative to press the fitted part in the receiving member to the residual distance from the stop surface and the means for permitting further movement of the ram head is operative to actuate the second stage of the ram.

4. The device of claim 1, wherein the force measuring means comprises a spring mechanism located between the ram head and the ram, and further comprising means for detecting a predetermined compression of the spring mechanism.

5. The device of claim 3, wherein the force measuring means comprises a spring mechanism located between the ram head and the ram, and further comprising means for detecting a predetermined compression of the spring mechanism.

6. The device of claim 2, wherein the means for detecting a predetermined compression of the spring mechanism comprises an electrical microswitch whose closure causes withdrawal of the wedge from the path of the ram.

7. The device of claim 4, wherein the means for detecting a predetermined compression of the spring mechanism comprises an electrical microswitch whose closure causes withdrawal of the wedge from the path of the ram.

8. The device of claim 3, wherein the means for detecting compression of the spring mechanism comprises a valve operated by movement of the ram head relative to the end of the ram and controlling the supply of a pressurized fluid to the second stage of the ram.

9. The device of claim 4, wherein the means for detecting compression of the spring mechanism comprises a valve operated by movement of the ram head relative to the end of the ram and controlling the supply of a pressurized fluid to the second stage of the ram.

* * * * *